United States Patent [19]

Satake et al.

[11] Patent Number: 5,317,399
[45] Date of Patent: May 31, 1994

[54] IMAGE REPRODUCING APPARATUS CAPABLE OF FREEZING A DISPLAYED IMAGE

[75] Inventors: Yoshifumi Satake, Yokohama; Ikuo Watanabe, Kawasaki; Motokazu Kashida, Musashino; Akihiro Shikakura, Kawasaki, all of Japan

[73] Assignee: Canon Kabushiki Kaisha, Tokyo, Japan

[21] Appl. No.: 113,530

[22] Filed: Aug. 30, 1993

Related U.S. Application Data

[63] Continuation of Ser. No. 696,007, May 6, 1991, abandoned.

[30] Foreign Application Priority Data

May 9, 1990 [JP] Japan ................................. 2-117560
Feb. 19, 1991 [JP] Japan ................................. 3-024329
Mar. 5, 1991 [JP] Japan ................................. 3-038290

[51] Int. Cl.$^5$ ..................... H04N 5/14; H04N 5/262; H04N 5/272
[52] U.S. Cl. .................... 348/571; 348/584; 348/565
[58] Field of Search .............. 358/160, 149, 312, 310, 358/146, 22, 183, 909, 182, 181, 22 PIP, 22 CK; 360/10.1, 35.1; H04N 5/14, 5/262, 5/272

[56] References Cited

U.S. PATENT DOCUMENTS

| 4,701,785 | 10/1987 | Willis | 358/31 |
| 4,862,269 | 8/1989 | Sonoda et al. | 358/160 |
| 4,918,530 | 4/1990 | Barton et al. | 358/183 |
| 4,982,279 | 1/1991 | Ishii et al. | 358/160 |
| 4,982,286 | 1/1991 | Iwabuchi et al. | 358/160 |
| 5,220,425 | 6/1993 | Enari et al. | 358/160 |

FOREIGN PATENT DOCUMENTS

| 56-048766 | 5/1981 | Japan | 358/183 |
| 57-073578 | 5/1982 | Japan | 358/183 |

Primary Examiner—James J. Groody
Assistant Examiner—Safet Metjahic
Attorney, Agent, or Firm—Fitzpatrick, Cella, Harper & Scinto

[57] ABSTRACT

Successively transmitted images are stored in frame memories the contents of which are displayed. The user can freeze a desired image in order to view it for a prolonged period of time. When the image thus frozen is released from the freeze mode, the content of the frame memory storing it continues to be displayed until anew image is stored in this frame memory. When a new image has been written in the frame memory and a stage is reached in which the image is to be displayed, display-setting information pertaining to this image is read out and the image is displayed in accordance with this information. In a case where the display-setting information indicates that the image is to be displayed in combination with a designated image transmitted earlier and it is determined that the storage destination of the designated image had previously been placed in the freeze mode, this means that an unrelated image is presently being stored at this storage location. Accordingly, the image at this location is not displayed in combination with the first-mentioned image, and therefore only the first-mentioned image is displayed.

7 Claims, 12 Drawing Sheets

| DESIGNATED FRAME NO. | 0 | 1 | 2 | 0 | 1 | 2 | 0 | 1 | 2 |
|---|---|---|---|---|---|---|---|---|---|
| WRITE FRAME NO. | 0 | 2 | 0 | 2 | 0 | 2 | 0 | 2 | 0 |
| OFFSET VALUE | 0 | 1 | 1 | 2 | 2 | 0 | 0 | 1 | 1 |

FIG. 8

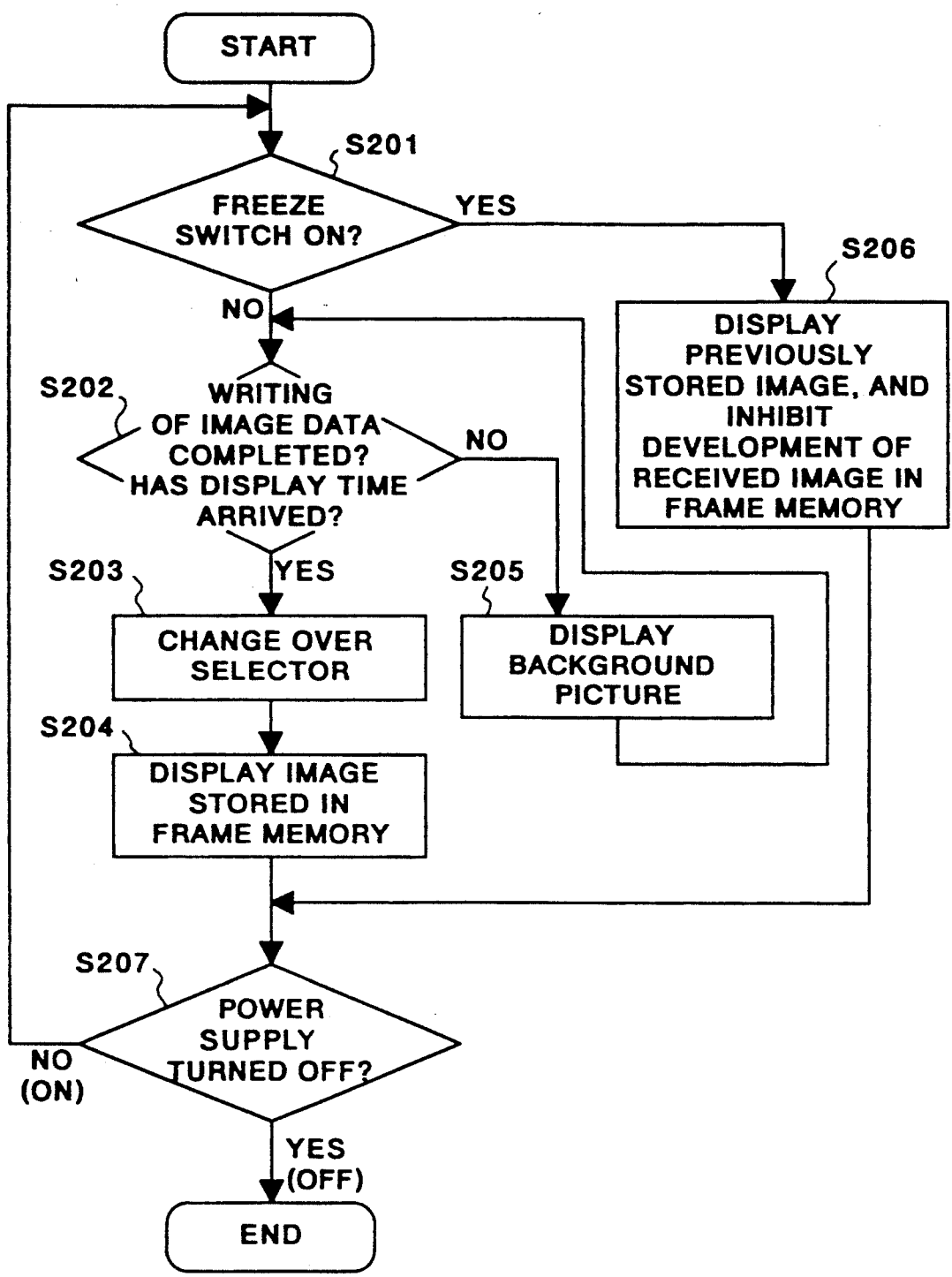
F I G. 12

IMAGE REPRODUCING APPARATUS CAPABLE OF FREEZING A DISPLAYED IMAGE

This application is a continuation of application Ser. No. 07/696,007, filed May 6, 1991, now abandoned.

BACKGROUND OF THE INVENTION

This invention relates to an image reproducing apparatus for displaying a still picture that has been received.

HDTV (high-definition television) has a large number of scanning lines and presents a very fine picture, thus making it possible to fully enjoy not only a moving picture but also a still picture. For this reason, use thereof in the fields of the arts, culture and animation is expected. In case of a still picture, the viewer observes a single picture thoroughly for several seconds to several tens of seconds, and therefore picture quality equivalent to that at the studio is required. Besides an HDTV moving-picture display apparatus, an HDTV still-picture reproducing apparatus has been considered that makes it possible to enjoy still pictures of studio quality.

FIG. 2 illustrates a still-picture reproducing apparatus according to the prior art.

A given information is received by the antenna of a receiver 201 so as to be converted into still-picture information. The output of still-picture information from the receiver 201 is restored to the original still-picture picture data by a still-picture decoder 202, and the still-picture data is developed as a still picture in one of frame memories 203 under the control of a frame memory controller 204. The still picture is read from the frame memory 203 by raster scanning performed by the frame memory controller 204. The read picture data is converted into an analog signal by a D/A converter 205 and is displayed as a still picture on a monitor 206.

The data format of a received still-picture broadcast is illustrated in FIG. 3.

As shown in FIG. 3, the still-picture data comprises data which sets a time that serves as a reference for displaying the condition of the still picture, display-setting data which sets the form in which the picture data is to be displayed, write-setting data for setting in which frame memory picture data is to be stored, and one frame of still-picture data, which is the actual condition of the still picture. A program effect using still-picture data can be considered as one form of display that can be established by the display-setting data. In the program effect, when it is desired to end the display of one still picture and display a still picture of interest, the display on the screen is gradually updated to the still picture of interest (by dissolving, wiping or scrolling) rather than merely changing over the screen. Alternatively, the display on the screen is combined with all (or a part) of an already received still picture in a frame memory.

As set forth earlier, since a still picture of this kind is highly attractive, naturally there are cases where it is desired to display a certain picture continuously. In order achieve this, it has been contemplated to provide the image-reproducing apparatus with a function for "freezing" the picture being displayed and with a function for cancelling the freeze mode. The term "freeze" means that the processing for reading a still picture of interest, which has been developed in a frame memory, from the frame memory to the monitor is continued until a cancel command is entered, and that the writing of other data into the frame memory whose picture is currently being displayed is prohibited.

Certain problems arise when an image reproducing apparatus is provided with such a freeze function. Specifically, in response to cancellation of the freeze mode, the frame memory whose picture is to be displayed is changed over. However, if the new frame memory whose picture is to be displayed is still receiving its data and undergoing writing, the possibility arises that an incomplete picture will be displayed on the screen because the data thereof is still in the process of being written in the frame memory. Such a display is unnatural and can confuse the viewer.

Another problem arises in the case of processing where one's own still picture is to be displayed superimposed on the still picture that has been stored in a frame memory. If this designated frame memory is one whose still picture has been frozen and, hence, the corresponding still picture (the one on which one's own picture is to be superimposed) has not been written therein, the combined picture displayed will be entirely different from the combined picture intended. This can only confuse the viewer.

SUMMARY OF THE INVENTION

An object of the present invention is to provide an image reproducing apparatus in which when a picture is frozen and then the freeze mode is cancelled, the image currently being written in the frame memory whose freeze mode has been cancelled will not be displayed.

According to the present invention, the foregoing object is attained by providing an image reproducing apparatus for storing successively inputted images in a plurality of frame memories and displaying the stored images, comprising freezing means for freezing an image being displayed, and control means for executing control in such a manner that when a freeze mode established by the freezing means is cancelled and at least an image to be displayed next has not been stored in any of the frame memories, an image which was being displayed prior to cancellation of the freeze mode is displayed.

According to another aspect of the present invention, the foregoing object is attained by providing an image reproducing apparatus comprising memory mean for storing a plurality of images, image input means for inputting the images, writing means for writing the inputted images in the memory means, display means for successively reading and displaying one image already written in by the writing means, setting means for establishing a setting so as to freeze the image being displayed, and control means for controlling the display means in such a manner than when the setting established by the setting means has been cancelled, the setting means continues to display a frozen image displayed earlier at least until the writing means completes writing of a new image.

Another object of the present invention is to provide an image reproducing apparatus in which input images are displayed one after another, wherein when a freeze mode is established and then cancelled, the same image will not be the subject of a display again.

According to the present invention, the foregoing object is attained by providing an image reproducing apparatus for inputting an image as well as information comprising input control information and output control information relevant to this image, storing this image in any one of a plurality of frame memories in accordance with the input control information, and displaying the stored image in accordance with the output control information relevant thereto, the apparatus comprising freezing means for freezing the displayed image, memory means for storing information which specifies a frame memory storing the image displayed as a frozen picture frozen by the freezing means, and means which, when a freeze mode established by the freezing means has been cancelled, and until the frame memory specified by the information stored by the memory means has been updated by a newly inputted image, excludes the image stored in this frame memory from output designated by the output control information.

According to another aspect of the present invention, the foregoing object is attained by providing an image reproducing apparatus comprising input means for inputting an image as well as information comprising input control information and output control information relevant to this image, memory means for storing a plurality o images, writing means for writing the image inputted by the input means in the memory means in accordance with the input control information, display means for displaying the image, which has been stored in the memory means, in accordance with the output control information corresponding to this image, setting means for establishing a setting so as to freeze the image being displayed, cancelling means for cancelling the setting established by the setting means, and control means which, until a new image has been stored in a storage area of the memory means that stored an image which was the subject of cancellation by the cancelling means, excludes the image in the storage area from output designated by the output control information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing a change in offset values in image writing processing according to the second embodiment;

FIG. 12 is an operation flowchart according to the third embodiment.

DESCRIPTION OF THE PREFERRED EMBODIMENT

Embodiments of the present invention will now be described in detail with reference to the accompanying drawings.

First Embodiment

Figure 1:
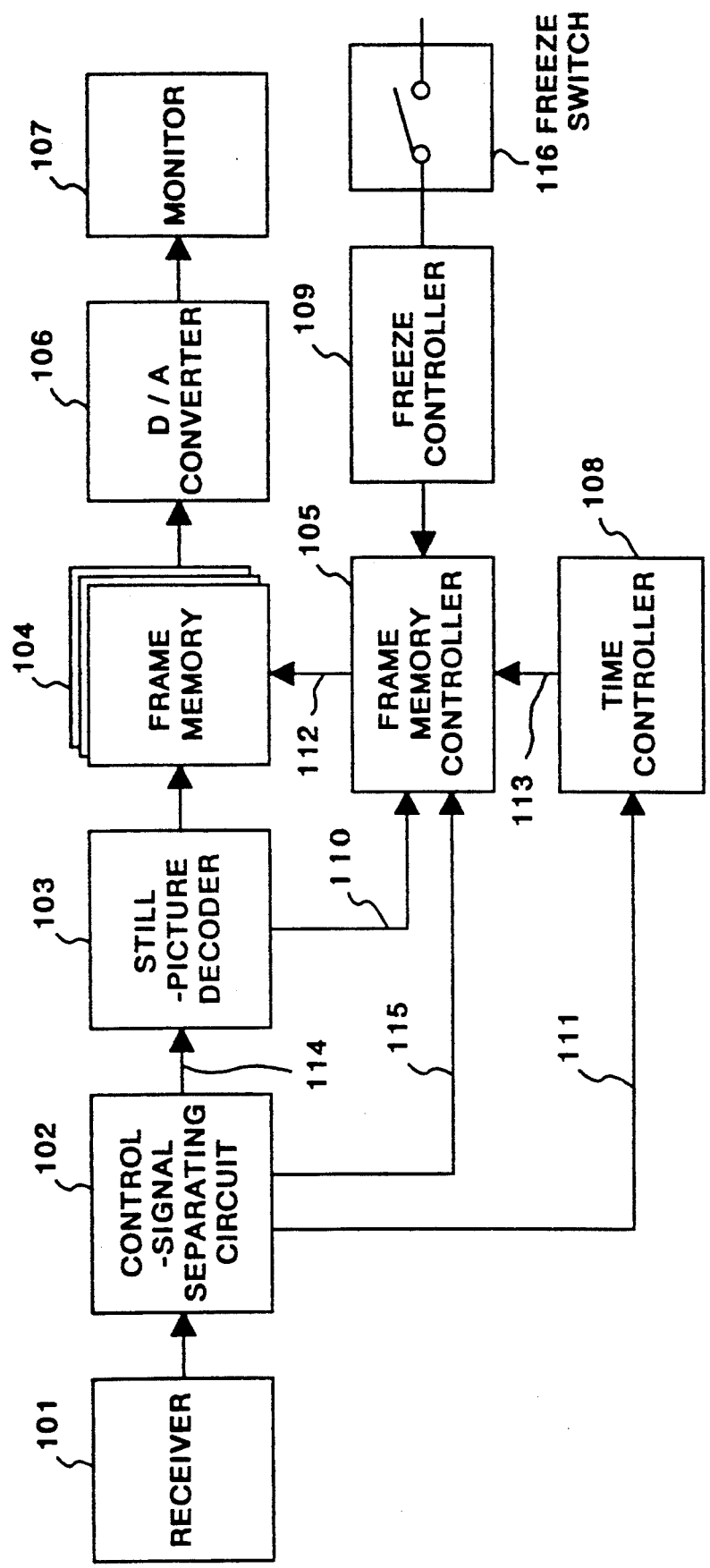
FIG. 1 is a block diagram showing a first embodiment of an image reproducing apparatus according to the present invention.
Figure 2:
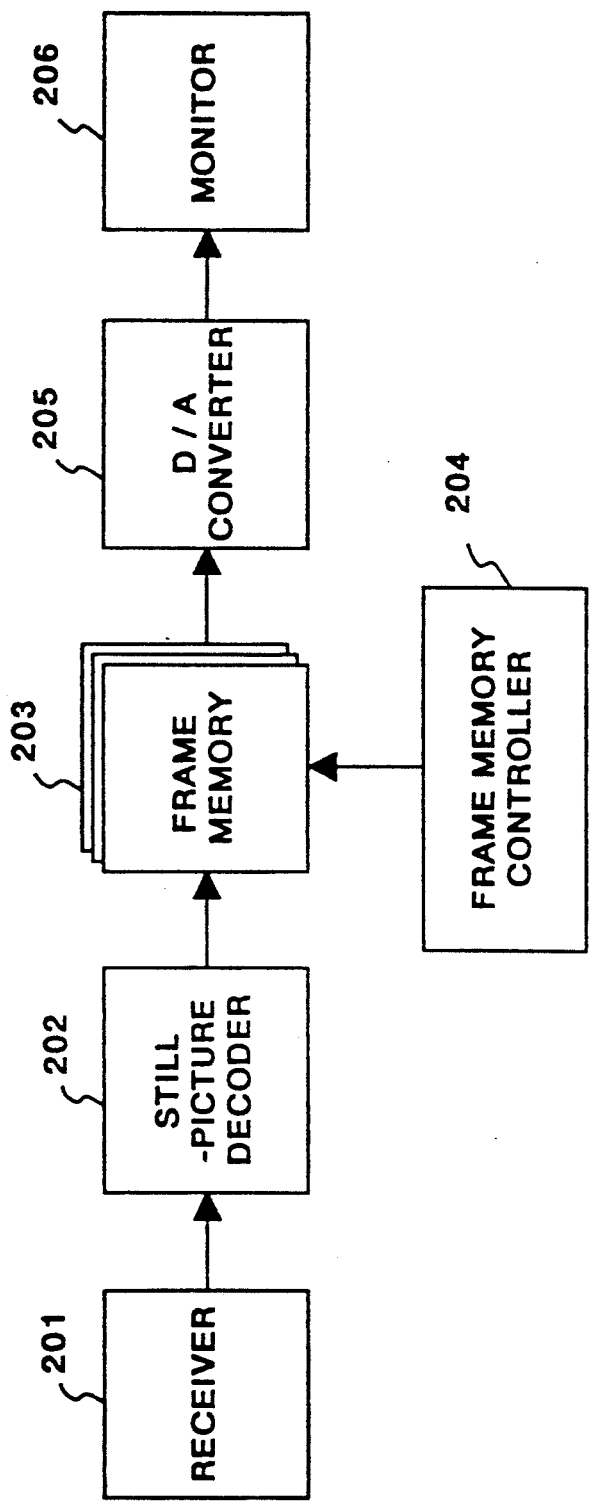
FIG. 2 is a block diagram showing an image reproducing apparatus according to the prior art.

FIG. 1 is a block diagram illustrating a first embodiment of an image reproducing apparatus according to the present invention.

As shown in FIG. 1, the apparatus of the invention includes a receiver 101 for receiving broadcast radio waves which enter from a receiver, and for converting the radio waves into still-picture information. The still-picture information is delivered to a control-signal separating circuit 102 for separating the still-picture information into the reference-time setting data, display setting data, write setting data and actual image data in the still-picture data format shown in FIG. 3. These separated items of data are outputted on signal lines 111, 114 and 115. A still-picture decoder 103 restores (decodes) the separated still-picture information from the control-signal separating circuit 102 to the original still-picture data. The output of the decoder 103 is delivered to a frame memory 104 capable of developing a plurality of the restored (decoded) still pictures. A frame-memory controller 105 controls the writing and reading (display) of the frame memory 104 and is constituted by a CPU or the like which operates in accordance with programs (incorporated in the form of a ROM) corresponding to the flowcharts of FIGS. 4 and 5, described below. A D/A converter 106 converts the image data, which has been read out of a frame memory at a raster scanning rate through line 112 by the frame memory controller 105, into an analog signal. A monitor 107 displays the tone image based upon the analog signal resulting from the conversion. A time controller 108 receives standard-time data 111 for displaying the still picture, which has been separated from the input still-picture information by the control-signal separating circuit 102, and designates the frame-memory controller 105 of the standard-time for displaying the still picture. A freeze controller 109 provides the frame-memory controller 105 with a signal indicating the on/off state of a freeze switch 116. When the freeze switch 116 is turned on (closed), the frame-memory controller 105 causes a continuous display of the content of the frame memory whose content is currently being displayed. Thus, even if a new image is received, this image is not written in the frame memory that has been placed in the freeze mode.

When the receiver 101 receives the next image, this image is written, as image data indicative of the next screen, in a frame memory area other than the frame memory whose image is currently being displayed. When this writing operation ends, the still-picture decoder 103 delivers a signal indicative of this to the frame. memory controller 105 via the signal line 110. When the frame-memory controller 105 receives this signal and judges that the time for displaying this image has arrived, the controller 105 causes display of the next image that has been developed in the frame memory 104 in accordance with the display data from signal line 115. Simply stated, even if the freeze switch 116 is turned off (opened), the previous image continues to be displayed until the next image has been completely developed in the frame memory 104 and the time for display thereof has arrived. By virtue of such an arrangement, it is possible to prevent the aforementioned problem encountered in the prior art, wherein the content of a frame memory in which nothing has yet been written or in which writing is currently in progress is displayed when the freeze switch is turned off.

Procedures according to this embodiment for achieving this operation will now be described in conjunction with the flowcharts of FIGS. 4 and 5.

Processing for displaying a still picture in accordance with the ON/OFF state of the freeze switch 116 will be described in accordance with FIG. 4. In this embodiment, it will be assumed that the frame memory 104 is composed of N-number of frame memories denoted 0, 1, 2, ..., N−1. Also, the frame-memory controller 105 is provided with a RAM (not shown) having an area which stores the frame number of the frame whose data is currently being displayed, as well as a write-inhibit flag which indicates this frame memory has been placed in the freeze mode, namely whether or not writing in this frame memory is permitted.

Figure 4:
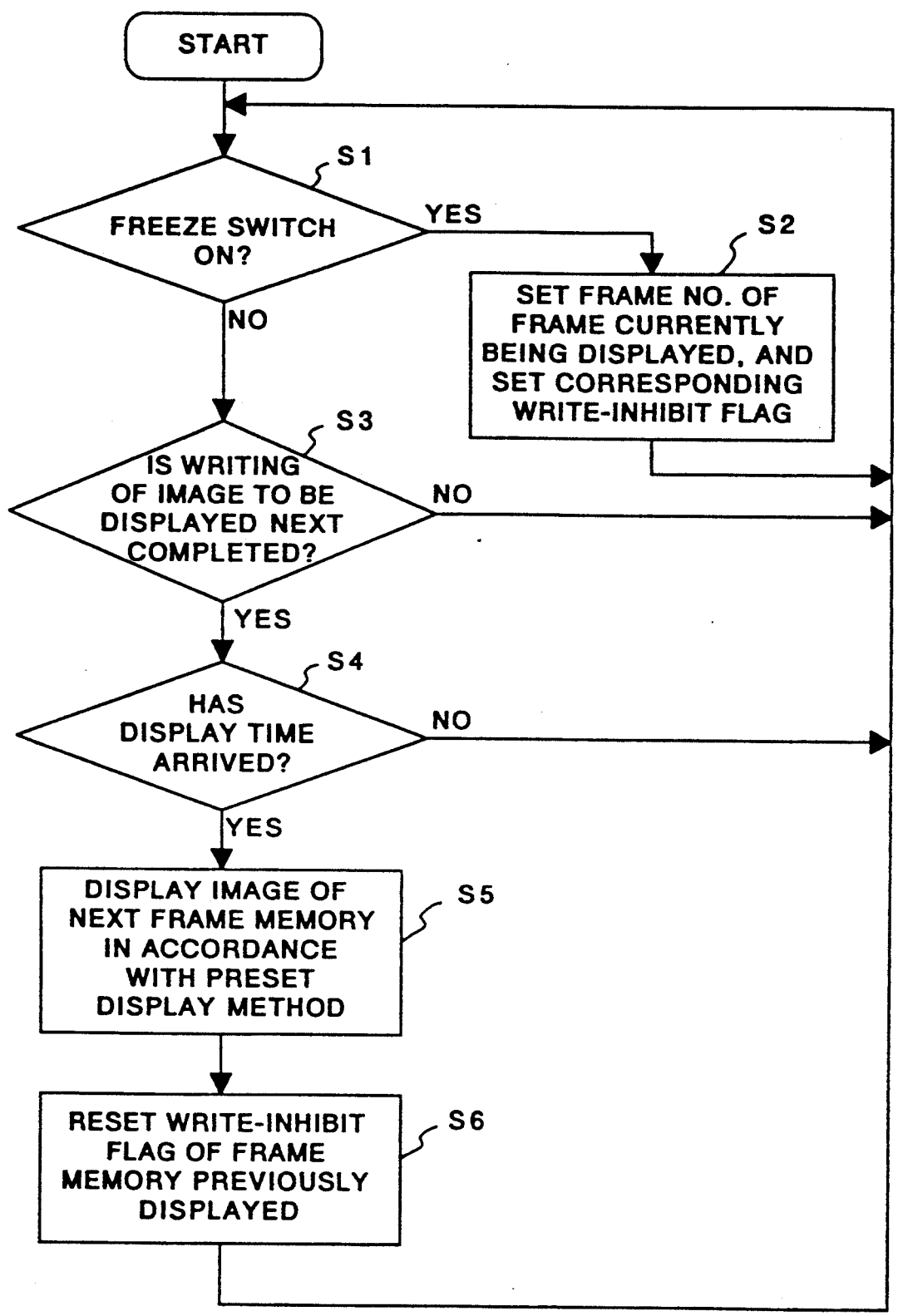
FIG. 4 is a flowchart showing the processing procedure in image reception according to the first embodiment.

It is determined at step S1 of the flowchart of FIG. 4 whether the freeze switch 116 is ON. If the switch is ON, the program proceeds to step S2, at which the frame number of the frame memory whose data is currently being displayed is set along with the flag indicating that the writing of data in this frame memory is not permitted. The data in the frame memory of interest continues to be displayed.

If the freeze switch 116 is found to be OFF at step S1, the program proceeds to step S3, at which it is determined whether the image to be displayed next has been written completely in a frame memory. In a case where writing is still in progress ("NO" at step S3), the program returns to step S1 to maintain the status quo. In other words, the image in the frame memory that was frozen continues to be displayed. When it is determined at step S3 that there is a frame memory in which the writing operation for the image to be displayed next has been completed, the program proceeds to step S4, at which it is determined whether the time has arrived for displaying the content of this frame memory. If the time has arrived, the program proceeds to step S5, where the content of this frame memory is displayed in accordance with an already set display method. The program then proceeds to step S6 to reset the write-inhibit flag for the frame memory in which writing has been inhibited until now, namely the frame memory whose content has hitherto been displayed.

Reception processing will now be described in accordance with the flowchart of FIG. 5. It should be noted that a frame counter serving as a pointer which indicates the frame memory that is the object of a writing operation has been established in a RAM (not shown) within the frame memory controller 105.

Figure 5:
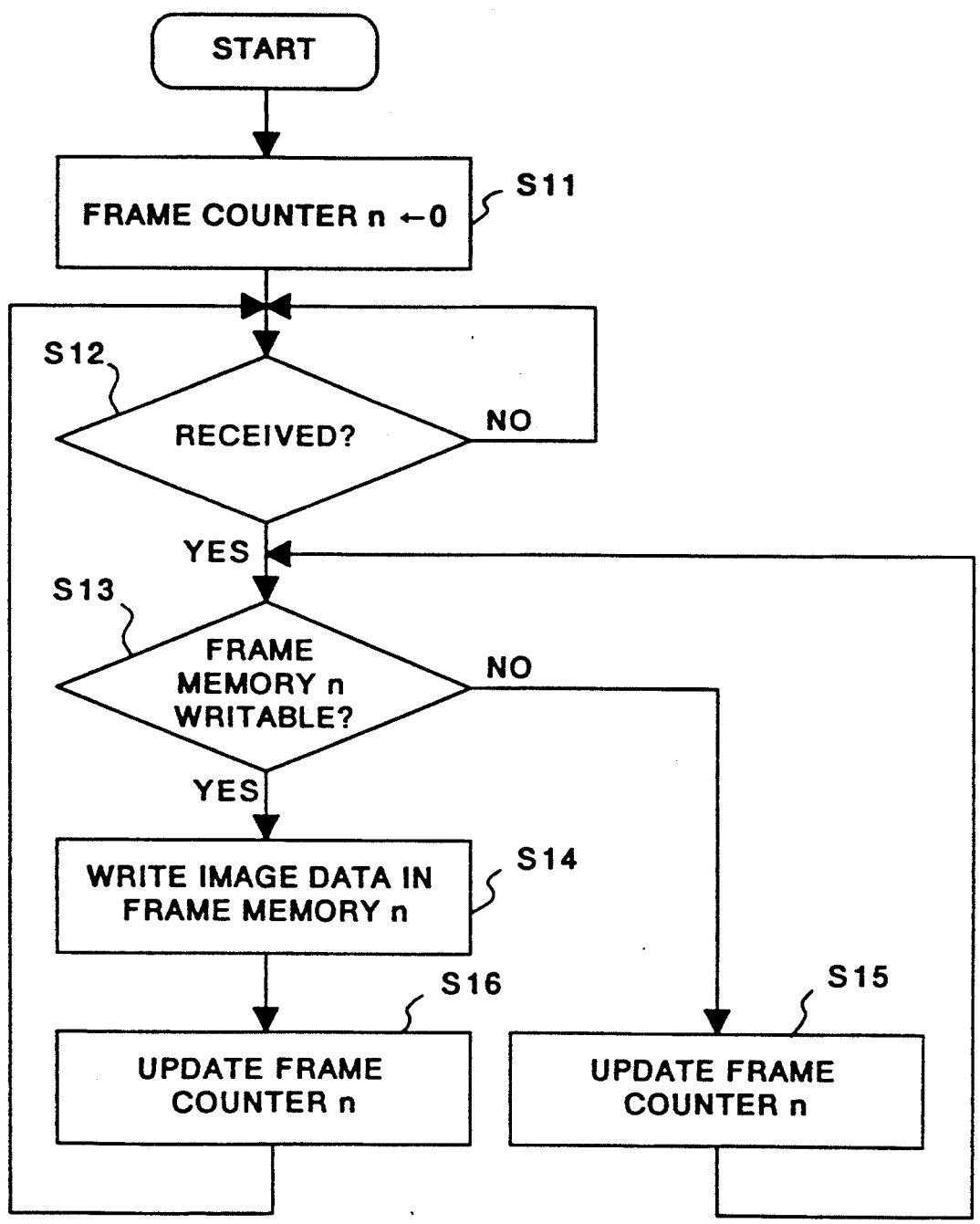
FIG. 5 is a flowchart showing the processing procedure in image display according to the first embodiment.

First, at step S11 in FIG. 5, the frame counter is initialized from n to "0" and the system waits for reception of a still picture at step S12. When reception of a still picture is detected, the program proceeds to step S13, where it is determined whether the frame memory indicated by the current value n in the frame counter is capable of being written. This can be determined by checking the frame whose content is currently being displayed and the status of its write-inhibit flag, as described earlier. If writing is permitted, the program proceeds to step S14. Here the received still picture is stored in the frame memory n, and the designated display time and display-setting data are stored in the RAM. The value of n in the frame counter is then incremented at step S16, after which the program returns to step S12. It should be noted that when the updated value of n in the frame counter becomes equal to the number N, namely when the condition n=N is established, the value of n in the frame counter is reset to "0" because there is no frame memory N.

In a case where a frame memory n in which an attempt is being made to write data is not permitted to undergo such a writing operation, the program proceeds to step S15, at which n in the frame counter is updated, after the determination of step S13 is performed again. It should be noted that this updating processing of the frame counter value n at step S15 is the same as that at step S16. In other words, if the frame counter value n indicates a frame memory that is not possible, the value of n is reset to "0" so as to indicate the initial frame memory.

In accordance with the first embodiment described above, even if the freeze switch is turned off and display of the next image is designated, the image previously accepted continues to be displayed until acceptance of the next image is completed and the time for displaying this image has arrived. Accordingly, it is possible to prevent display of an image that has not yet been written in a frame memory or that is in the process of being written in.

Further, in the first embodiment described above, still pictures received while the freeze switch 116 is in the ON state are sequentially written in order from the oldest to the latest. When the freeze switch 116 is then turned OFF, the still picture to be displayed next is not written in the frame memory. Even if a frame memory whose data is currently being displayed should happen to be designated as the destination for the writing operation, the received image will not be written in this frame memory. As a result, an image in the process of being written will not be displayed.

In the foregoing embodiment, an example is described in which the apparatus primarily displays a still picture from a satellite broadcast. However, in case of an image of the kind in which there is no designation of display time, it is permissible to adopt an arrangement in which the image is displayed at the completion of writing.

Second Embodiment

The gist of the second embodiment will be described first.

Figure 3:
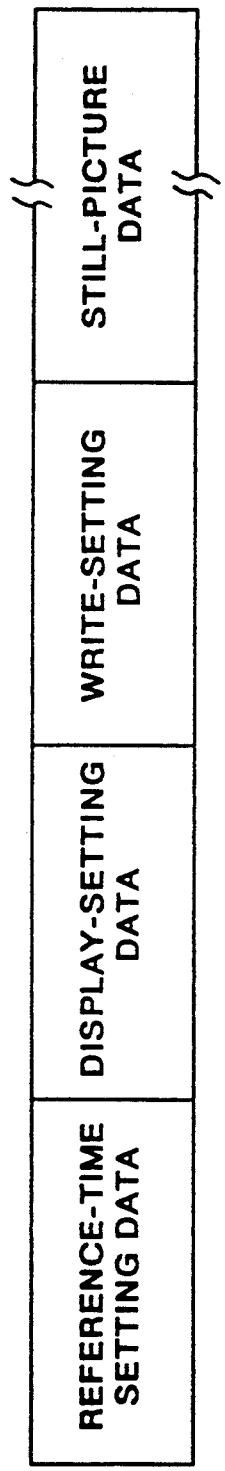
FIG. 3 is a diagram showing the data format of a still-picture broadcast.

There are instances where the display-setting data (see FIG. 3) of the received data shown in FIG. 3 contains information which sets the method of displaying still-picture data that is to be sent. A problem arises when this information is designating information for displaying one's own still picture in combination with a still picture that was sent previously, for example, for displaying the still picture in combination with a still picture that was sent two pictures earlier. For instance, consider an example in which the apparatus has three frame memories and that the first of these has been frozen. In such case, still pictures received subsequently are stored in the second and third memories, and as long as the first memory is maintained in the freeze mode, subsequent still-picture data is written starting with the second frame again. Accordingly, even if the display-setting data in still-picture data just received contains information which designates combination with the still picture received two pictures earlier, the frame memory in which the corresponding still picture should have been stored will be the first frame memory, and the still picture of interest (the still picture just received) ends up being combined with a completely unrelated still picture.

In the second embodiment of the invention, such combination of one still picture with one completely unrelated thereto is avoided.

Figure 6:
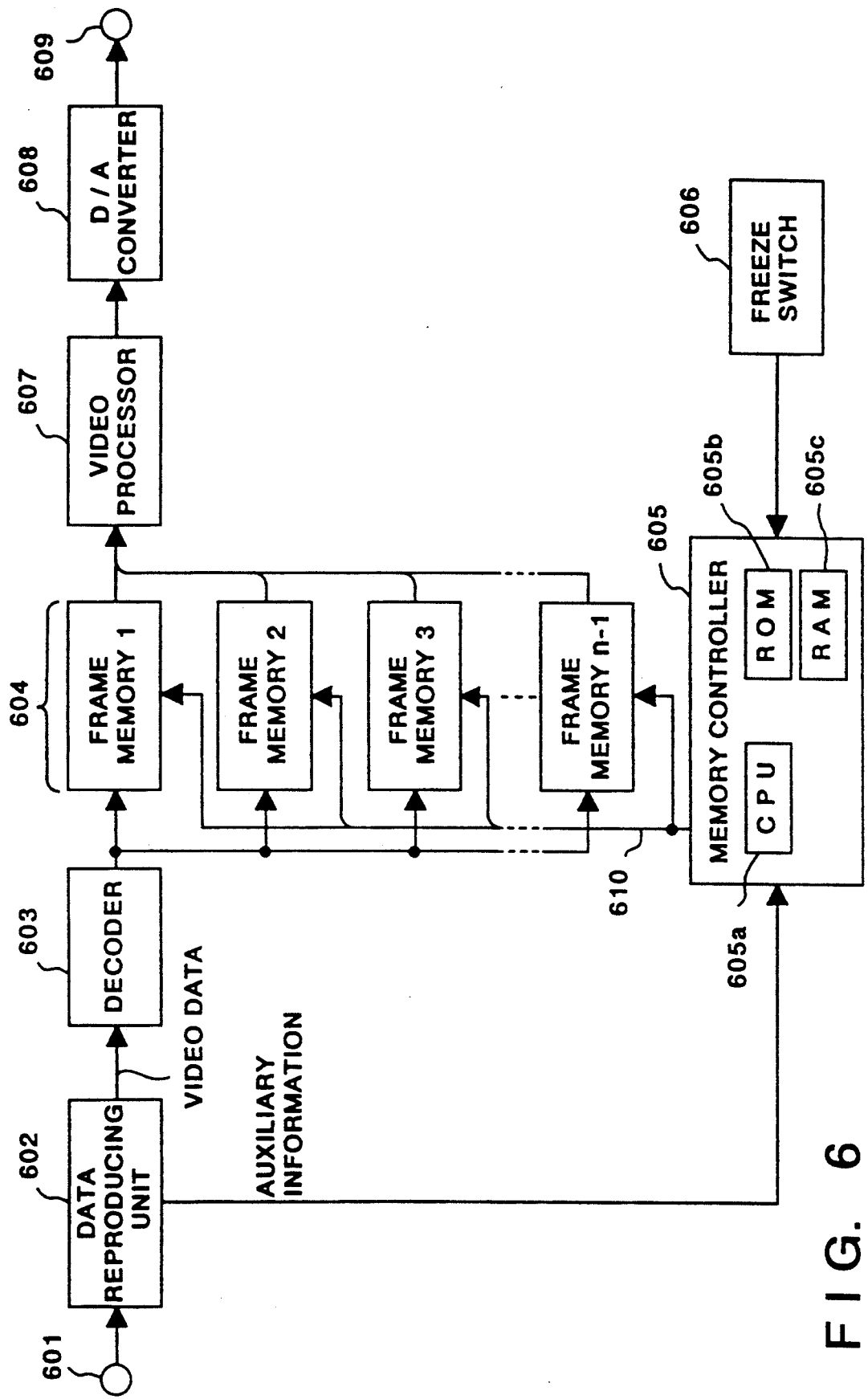
FIG. 6 is a block diagram showing a second embodiment of an image reproducing apparatus according to the present invention.

FIG. 6 is a block diagram illustrating the apparatus of this second embodiment.

The principal components of this embodiment are almost the same as those shown in FIG. 1. Numeral 601 denotes an input terminal, and 609, an output terminal. A data reproducing unit 602 corresponds to the receiver 101 and control-signal separating circuit 102 of FIG. 1, and a decoder 603 corresponds to the still-picture decoder 103. A frame memory 604 corresponds to the frame memory 104, and a D/A converter 608 corresponds to the D/A converter 106. In the second embodiment, however, the functions of the time controller 108 and freeze controller 109 are controlled and managed by a memory controller 605. As shown in FIG. 6, the memory controller 605 comprises a CPU 605a serving as a microprocessor, a ROM 605b which stores the operating processing procedure (the programs shown in the flowcharts of FIGS. 9 and 10, described later), and a RAM 605c used as a working area. Further, the memory controller 605 supplies each frame memory with a control signal, via a signal line 610, that renders the frame memory capable of reading or writing.

Figure 7:
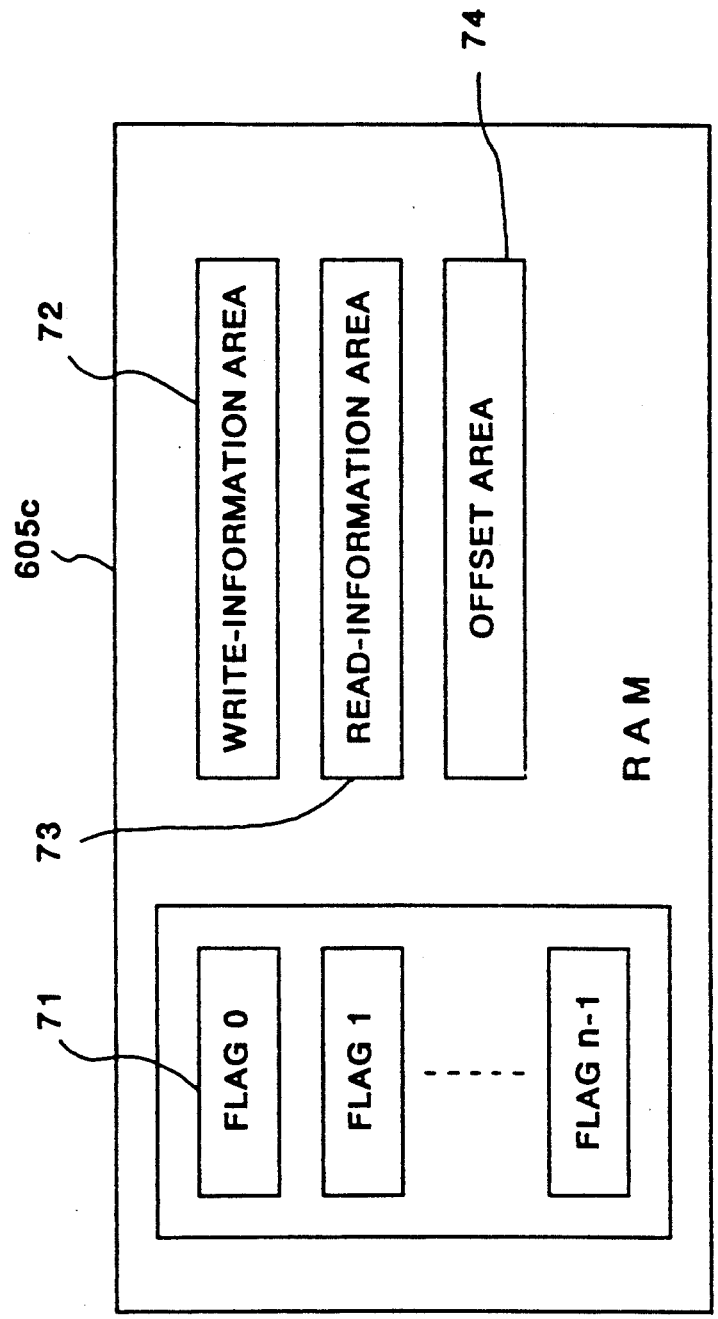
FIG. 7 is a diagram showing the data area of a RAM in a memory controller according to the second embodiment.

FIG. 7 illustrates the contents of the RAM 605c.

As shown in FIG. 7, the RAM 605c of the memory controller 605 in the second embodiment includes a flag area 71 to which are assigned a group of flags (each of which is referred to as a "freeze flag" hereinafter) storing status information corresponding to the frame memories; a write-information area 72 for storing write information (the write-setting data shown in FIG. 3) indicating in which frame memory a received still picture is to be written; a read-information area 73 for storing information (the display-setting information shown in FIG. 3) indicating the manner in which a still picture stored in a frame memory is to be read out; and an offset area 74 storing offset values which decide the actual write destination of a received still picture.

The offset values will be briefly described using FIG. 8.

In order to simplify the description, it will be assumed that there are three frame memories 0, 1 and 2. It will be assumed that the sides which transmit the still pictures also employ 0, 1, 2, 0, 1, 2, . . . as the frame memory numbers that are the destinations for writing in the still pictures.

Assume now that the second frame memory 1 is placed in the freeze mode so that the still picture stored therein continues to be displayed. In the meantime, of course, still-picture data still continues to be sent in successive fashion. FIG. 8 indicates the relationship which prevails in this case between the write-destination frame memory number designated by the side and the frame memory number of the frame memory in which writing actually takes place.

Basically, an offset value is added to the frame memory number designated by the sending side, and the still-picture data received is written in the frame memory whose number is designated by the sum. In a case where it has been determined that the frame memory designated by the sum is in the freeze mode, the offset value is incremented by "1". It should be noted that the offset value is "0" in the initial state, and that when n−1 is attained as the value, the next value of the offset is "0" again. In addition, when the frame memory of interest is not in the freeze mode, the offset value remains at the previous value. In other words, the foregoing can be summarized as follows:

OFFSET VALUE=(incremented offset value) mod n (where X mod Y is the remainder of dividing X by Y).

In actuality, the objective is that a frame memory whose still picture is currently being displayed or which stores a frozen still picture be avoided when writing image data, and therefore the foregoing processing need not be adhered to as a long as the stated objective is attained.

An operation for writing a received image in the second embodiment will now be described in accordance with FIG. 9. In the description that follows, accessory information refers to the reference-time setting data, display-setting data and write-setting data in the data format of FIG. 3. Furthermore, the offset values that have been stored in the offset area 74 are referred to simply as offsets hereinafter.

Figure 9:
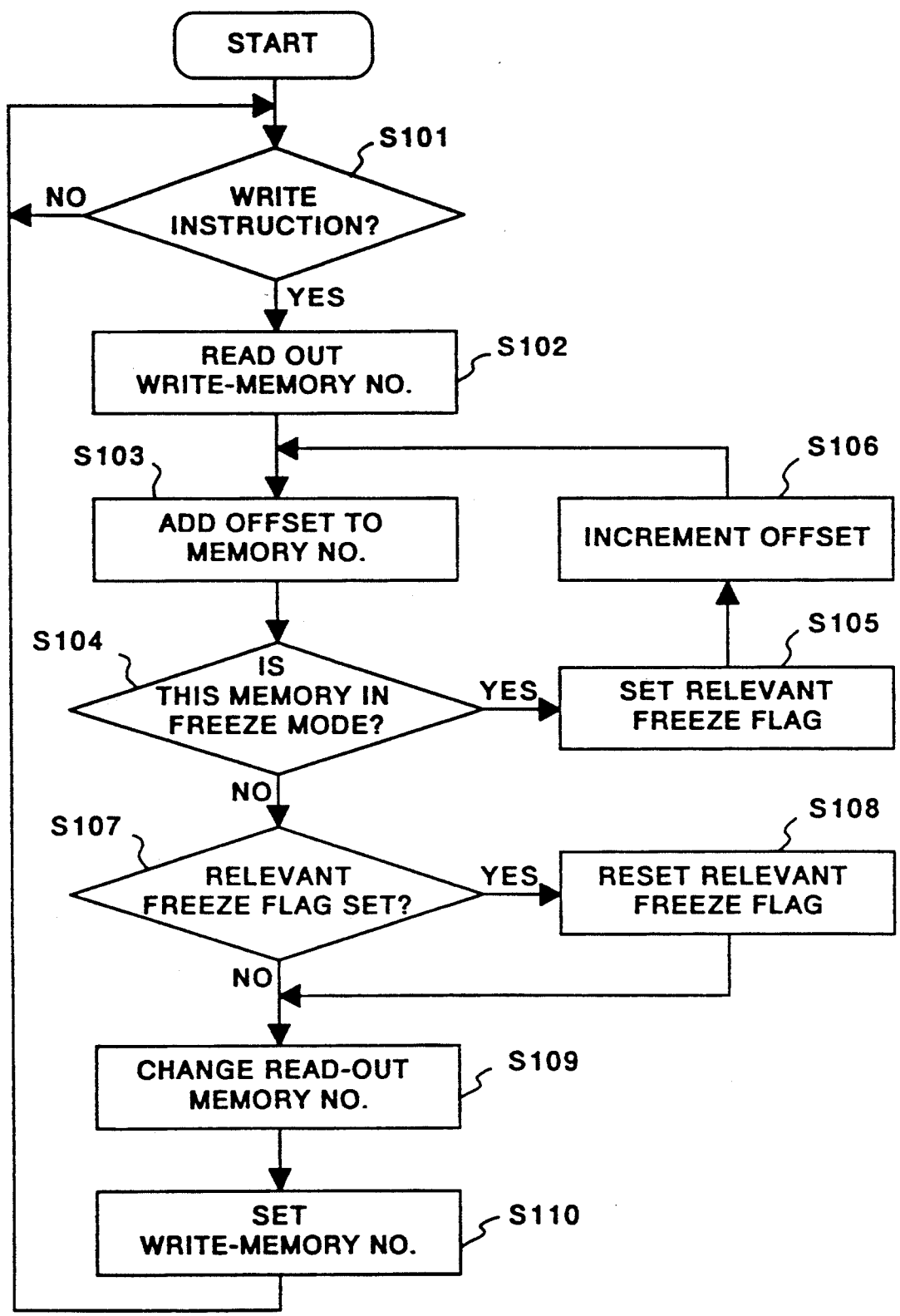
FIG. 9 is a flowchart showing the processing procedure in image reception according to the second embodiment.

First, at step S101 in the flowchart of FIG. 9, the system waits for an instruction for writing in still-picture data. In other words, the system awaits reception of a still picture. When a still picture arrives, a write-frame memory number (the number of the frame memory in which writing is supposed to take place) in the auxiliary information contained in the received data is temporarily stored in the write-information area 72 at step S102. Next, at step S103, the value of offset 74 is added to the stored number of the write frame memory. As described earlier, the value of the offset 74 is a quantity indicating the amount by which the designated frame memory is to be shifted in a case where the frame memory has been placed in the freeze mode. If freezing has not been applied even once, the offset is "0" and the initial value when power is introduced also is "0".

Next, by checking the status of a freeze switch 606 (FIG. 6), it is determined at step S104 whether the frame memory whose number is indicated by the sum of the designated memory number and the offset is in the freeze mode. If it is determined that this frame memory is in the freeze mode, "1" is set as the freeze flag (step S105) in the flag area 71 that corresponds to this frame memory. Hereinafter, "set" shall be taken to mean writing "1" as the pertinent flag, and reset shall be taken to mean writing "0" as the pertinent flag.

Though the details will be set forth later, display processing is such that when a designation is made to display the image contained in a certain frame memory, the freeze flag corresponding to this frame memory is investigated. By so doing, it can be determined whether this frame memory has been placed in the freeze mode previously. In other words, it can be determined that a frame memory whose freeze flag has been set after cancellation of the freeze mode does not have data which was originally to be written in the memory, and reading of this frame memory can thus be inhibited. This makes it possible to prevent disturbance of the video or display of a meaningless picture.

When the freeze flag of the pertinent frame memory has been set at step S105, the offset is incremented at step S106. The processing of step S103 is then executed again. However, the addition processing of step S103 is performed after the write-frame memory number (to which an offset has already been added by the preceding processing) in the write-information area 72 is returned to the value obtained from the auxiliary information that prevailed at the time of reception. In this way the writing of data in the frame memory of interest will not take place.

When it is determined at step S104 that the frame memory corresponding to the frame memory number resulting from the calculation of step S103 is not in the freeze mode, processing proceeds from step S104 to step S107.

It is determined at step S107 whether the freeze flag corresponding to this frame memory has been set. If this flag has been set, this indicates that this frame memory was placed in the freeze mode and then released from the freeze mode, and that new data has not been written in this frame memory since release from the freeze mode. In other words, this means that this particular frame memory is presently storing an image that has already been displayed. Accordingly, the program proceeds to step S108, at which the relevant freeze flag is reset.

When the freeze flag of the relevant frame memory number has not been set or has been set but then reset, the program proceeds to step S109. Here the read-frame memory number stored in the read-information area 73 is changed to the frame memory number of interest. This is to prevent losing sight of the image, which is the object of display, when the transition is made to the display stage.

Next, the frame memory number of a frame memory for writing is set at step S110. Specifically, only a frame memory whose number has been set is placed in a write-enable state. Though the decoder 603 outputs a decoded image to each frame memory, there is only one frame memory in the write-enable state at any one time, and hence the result is that the image is written in the designated frame memory.

Figure 10:
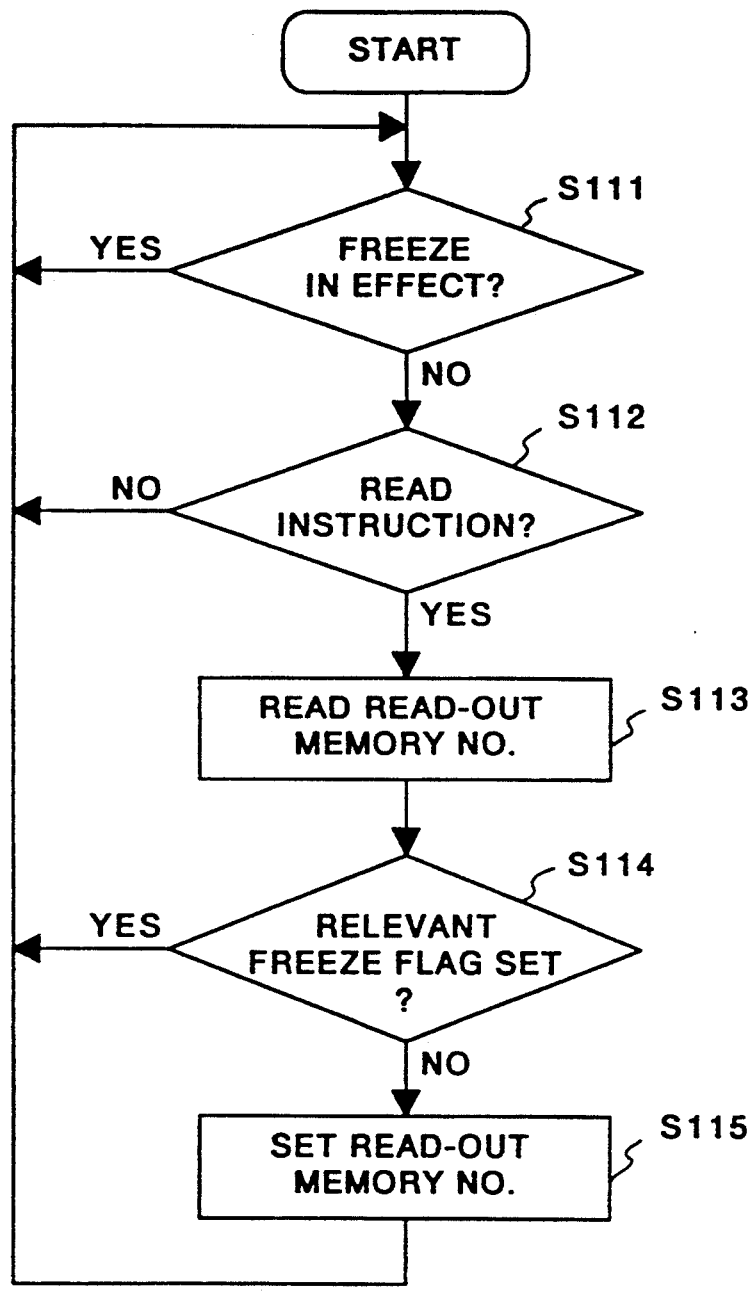
FIG. 10 is a flowchart showing the processing procedure in image display according to the second embodiment.

The operation performed at the time of read-out will be described in accordance with the flowchart of FIG. 10.

First, at step S111, it is determined whether there is a frame memory currently in the freeze mode. If the arrangement is such that data which indicates the number of the frame memory whose data is currently being displayed is stored in a RAM or the like at the start of the display of the image in each frame memory, then which frame memory is undergoing display can be determined at any time.

If a frame memory is found to be in the freeze mode at step S111, the displayed state is maintained. If no frame memory is in the freeze mode, then the program proceeds to step S112, at which the data in the read-information area 73 is investigated to detect a read instruction. The number of frame memories that can be the subject of a read instruction is not limited to one. The reason for this, as set forth earlier, is that though there are cases where only an image A to which this instruction is appended is displayed, there are also cases where image A is combined with an image B that was supposed to have been transmitted previously. In the latter, both images A and B will be read out of their respective frame memories.

If a read instruction has been detected, the relevant frame memory number is read at step S113, and then it is determined at step S114 whether the freeze flag corresponding to this frame memory has been set. If the freeze flag has been set, it is possible to determine that the data in the relevant frame memory is already-displayed data frozen in the past, and it is possible to determine a case in which this data differs from data that was to have been written in the memory originally. In addition, if the content of this frame memory were to be displayed, there is the danger that the reading and writing of the image would clash and lead to a disturbed picture. Accordingly, the content of this frame memory is not displayed.

On the other hand, if it is found at step S114 that the freeze flag has not been set, the frame memory number read at step S113 is read out as a frame memory number for reading and the relevant frame memory is placed in the read-enable state (step S115).

Take the foregoing case as an example. When image A is to be displayed in combination with the image B, the image A is displayed, but image B which was supposed to be displayed in combination with image A is not in the intended frame memory. Consequently, only image A is displayed.

By performing such an operation on the receiving side, a new read-frame memory number will not be set during the freeze mode, and the frozen image data continues to be displayed.

In the absence of a frozen image (which includes an instance in which the freeze mode has been cancelled), the video data in the frame memory newly designated at step S115 is displayed. Moreover, in case of read-designating information calling for display of video, which prevailed (n−1) pictures earlier, as opposed to the latest video information after cancellation of the freeze mode, the display of the image which prevailed (n−1) pictures earlier is not performed. As a result, a meaningless still picture is not displayed and the video is not disturbed. Furthermore, if the image which prevailed (n−2) pictures earlier has been stored as opposed to the latest video information after cancellation of the freeze mode, this video is capable of being displayed in the state intended by the sending side.

In the first and second embodiments described above, a still-picture is the type of image. However, this does not impose a restriction upon the present invention. For example, an optical fiber or wire can be used as a transmission line. In case of cumulative transmission, media which can be used include a tape recording medium such as a digital VTR or DAT, a disk-type storage medium such as a floppy disk or optical disk, or a discrete medium such as a semiconductor.

Furthermore, in a case where an image which is the subject of a combined display has not been written at the originally intended location, it can be determined whether this image has been stored in another frame memory. Then, if the image is found, this image can be used in a combined display. In this case, both frame memory numbers designated by the sending side and frame memory numbers changed on the side of the image reproducing apparatus can be tabulated and stored to manage the system. This will make it possible to attain the objects of the invention.

Third Embodiment

A third embodiment of the present invention will now be described in detail with reference to FIGS. 11 and 12.

Figure 11:
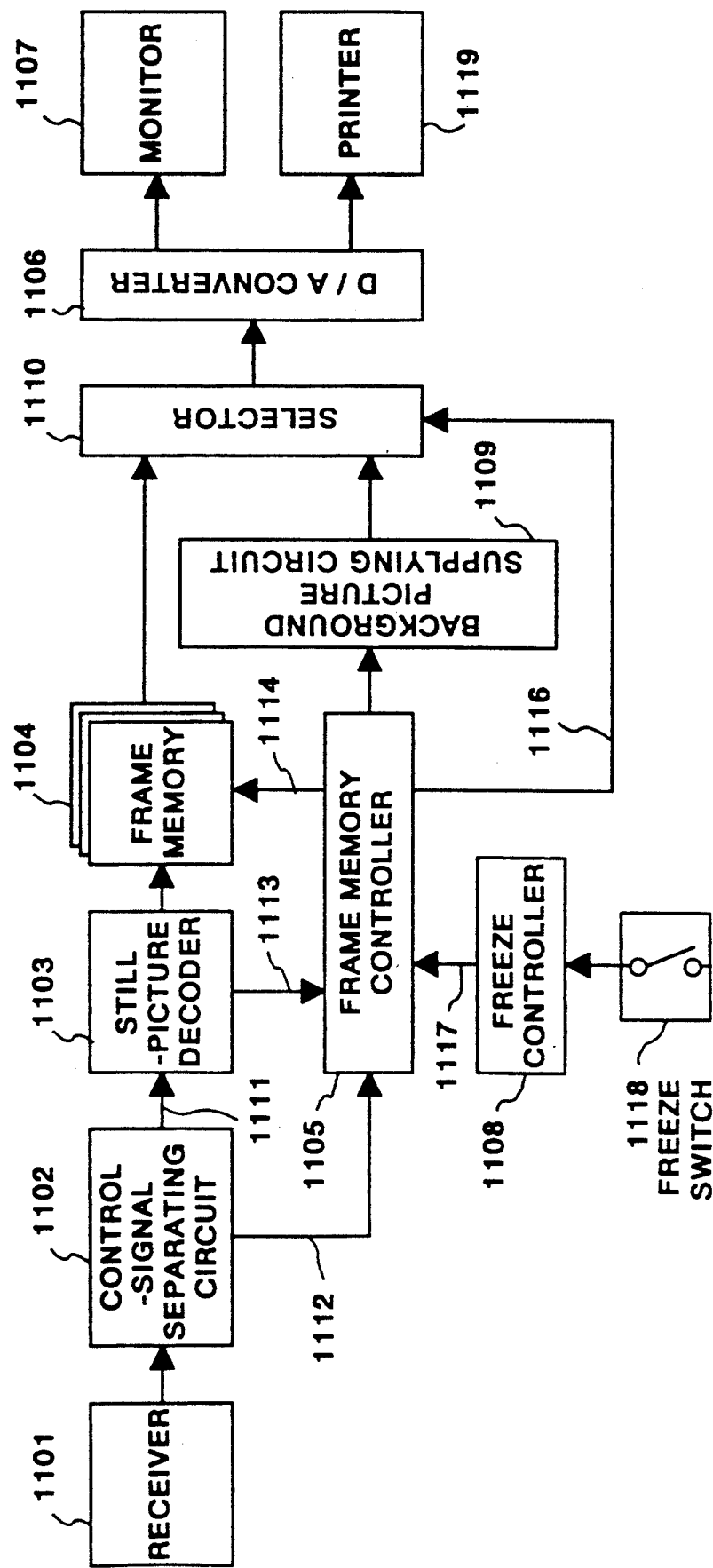
FIG. 11 is a block diagram showing the construction of a still-picture reproducing apparatus according to a third embodiment of the present invention.

FIG. 11 is a block diagram illustrating the construction of an image reproducing apparatus which is a typical embodiment of the present invention.

As shown in FIG. 11, a transmitted image signal is received by a receiver 1101, which converts the signal into still-picture information. Next, a control-signal separating circuit 1102 separates the still-picture information outputted by the receiver 1101 into display-control data and compressed image data. The separated items of data are outputted on signal lines 1111, 1112.

The image data separated and compressed by the control-signal separating circuit 1102 is restored to the original still-picture data by a still-picture decoder 1103, which delivers the resulting data to a frame memory 1104. The frame memory 1104 is capable of storing a plurality of restored still pictures. On the basis of the display-control data separated by the control-signal separating circuit 1102, a frame memory controller 1105 controls the writing and reading of the frame memory 1104 via line 1114 and controls a selector 1110 through line 1116.

Image data read in accordance with a control signal supplied from the frame memory controller 1105 to the frame memory 1104 is converted into an analog signal by a D/A converter 1106. The output signal of the D/A converter 1106 is delivered to a monitor 1107. The latter displays a tone image based upon the analog signal resulting from the D/A conversion. A printer 1119 prints out a hard copy of a frozen picture displayed on the monitor 1107.

A freeze controller 1108 outputs a signal indicative of the ON/OFF status of a freeze switch 1118 through line 1117 to the frame memory controller 1105. When the freeze switch 1118 is turned on, the free memory controller 1105 transmits a control signal to inhibit the writing of newly received image data in the frame memory 1104 and to continue the display of a previously received and recorded picture. When the freeze function has been cancelled, a background picture supply circuit 1109 outputs background data to the selector 1110. At the same time, the selector 1110 changes over between the output from the background picture supply circuit 1109 and the output from the frame memory 1104 and outputs the background picture to the D/A converter 1106.

Reference will now be had to the flowchart shown in FIG. 12 to describe operation in a case where the freeze switch 1118 is switched from ON to OFF (i.e., when the still-picture freeze function is cancelled) in the image reproducing apparatus of the third embodiment constructed as set forth above. It will be assumed here that the apparatus is operating owing to the introduction of power and that at least one frame of image data has been developed in the frame memory 1104, and that the selector 1110 ordinarily connects the background picture to the monitor 1106. (In other words, it will be assumed that the freeze switch is in the ON state.)

First, at step S201, it is determined whether the freeze switch 1118 is in the ON state. If it is determined that the freeze switch 1118 is OFF (i.e., that the freeze function has been cancelled), the program returns to step S202. On the other hand, if the freeze switch 1118 is found to be ON (i.e., if the freeze function is found to be operational), then the program proceeds to step S206.

It is determined at step S202 whether image data is capable of being displayed on the monitor 1107. To this end, the frame memory controller 1105 determines, based upon a standby signal outputted on signal line 1113 from the still-picture decoder 1103, whether the writing of image data in frame memory 1104 has been completed. Further, it is determined whether image data whose writing has been completed already is indicative of a predetermined display time. If both of these conditions are satisfied, namely if writing of the image data has been completed and the display time has arrived, the program proceeds to step S203, at which the selector 1110 is changed over from the background picture supply-side to the side for input of image data from the frame memory. This changeover is performed in accordance with the following timing:

The freeze controller 1108 supplies the frame memory controller 1105 with a signal indicative of the fact that the freeze switch 1118 has been switched from ON to OFF (i.e, a signal indicating that the freeze function has been cancelled). At this time, however, if the changeover of the selector 1110 does not take place, the frame memory controller 1105 receives the standby signal outputted by the still-picture decoder 1103 and determines that the display time for the next picture has arrived, then the frame memory controller 1105 responds by outputting a control signal via the signal line 1116 in order to effect a changeover so that the input data to the D/A converter 1106 is switched from the background picture data supplied by the background picture supply circuit 1109 to the image data outputted by the frame memory 1104.

Next, at step S204, the image that has been stored in the frame memory 1104 is displayed on the monitor 1107 in accordance with the display-control data outputted by the control-signal separating circuit 1102 via the signal line 1112. Thereafter, the program proceeds to step S207. If the power-supply switch is OFF, processing is terminated. Otherwise processing returns to step S201. Display of the image continues so long as the freeze switch is not turned ON.

On the other hand, if either of the above-m two conditions (completion of writing of the next picture and arrival of the display time) is not satisfied, the program proceeds to step S205, at which the background picture is displayed.

Next, if the freeze switch 1118 is in the ON state, the program proceeds to step S206, writing in frame memory during display of the received image is inhibited and the image currently being displayed continues to be displayed as is, and the program then proceeds to step S207. If the power-supply switch is OFF, processing is terminated. Otherwise, the program returns to step S201 and the system waits for cancellation of the freeze function. In this state, display of the frozen image continues so long as the freeze switch 1118 is not turned OFF. However, when the freeze switch 1118 is turned OFF, the program proceeds to the step S202 described above and processing for the case where the freeze function is cancelled is executed.

Thus, even in a case where the freeze switch is switched from ON to OFF, the image data of the next picture is developed in the frame memory 1104 at a storage location other than that completely frozen, and the background picture continues to be displayed until the display time for this data arrives.

In accordance with this embodiment, therefore, when the freeze switch is switched from ON to OFF, namely when the freeze function is cancelled, the background picture can continue to be supplied to the monitor until the writing of the image to be displayed next in the frame memory has been completed and the display time of this received image has arrived. This makes it possible to prevent a disturbed image from being displayed.

Thus, in accordance with the third embodiment, as described above, background data is displayed temporarily after the instruction for freezing the displayed image is cancelled. This makes it possible to prevent the display of a disturbed image.

Although the invention has been described in its preferred form with a certain degree of particularity, it is understood that the present disclosure of the preferred form has been changed in the details of construction and the combination and arrangement of the parts may be resorted to without departing from the spirit and scope of the invention as hereinafter claimed.

What is claimed is:

1. An image reproducing apparatus for inputting a coded image as well as information comprising input control information and output control information relevant to this image, decoding this coded image, storing this decoded image in any one of a plurality of frame memories in accordance with the input control information, and displaying the stored image in accordance with the output control information relevant thereto, comprising:

freezing means for freezing the displayed image regardless of the output control information;

memory means for storing information which specifies a frame memory storing the image displayed as a frozen picture frozen by said freezing means; and control means for, when a freeze mode established by said freezing means has been cancelled, and until the frame memory specified by the information stored by said memory means has been updated by a newly inputted image, excluding the image stored in this frame memory from output designated by the output control information, wherein the image includes a still picture, the input control information includes information designating a frame memory which is to be a destination for writing in the still picture, and the output control information includes information designating a frame memory which stores an image to be combined with the still picture.

2. The apparatus according to claim 1, wherein the output control information includes information designating image display time as well as special effects when display of an image which is the subject of a combined display is changed over.

3. An image reproducing apparatus, comprising:
   input means for inputting a coded image as well as information comprising input control information and output control information relevant to this image;
   decoding means for decoding the inputted coded image;
   memory means for storing a plurality of images decoded by said decoding means;
   writing means for writing the image inputted by said input means in said memory means in accordance with the input control information;
   display means for displaying the image, which has been stored in said memory means, in accordance with the output control information corresponding to this image;
   setting means for establishing a setting so as to freeze the image being displayed regardless of the output control information;
   cancelling means for cancelling the setting established by said setting means; and
   control means for, until a new image has been stored in a storage area of said memory means, said storage area being an area in which a frozen image had been stored, excluding the image in said storage area from output designated by the output control information, wherein
   the image includes a still picture, the input control information includes write-location designating information which designates a location at which the still picture is written in said memory mans, and the output control information includes read-location designating information which designates the read-out location of an image to be combined with the still picture.

4. The apparatus according to claim 3, wherein said display means displays, in combined form, an image read out in accordance with the read-location designating information contained in the output control information and an image to which the output control information is attached.

5. The apparatus according to claim 4, wherein the output control information includes information designating image display time as well as special effects when display of an image which is the subject of a combined display is changed over.

6. An image processing apparatus capable of presenting a frozen display of image data, comprising:
   receiving means for receiving coded image data for which an image display time has been predetermined;
   decoding means for decoding said coded image data received by said receiving means;
   memory means for storing the image data decoded by said decoding means;
   writing means for writing the image data decoded by said decoding means into said memory means;
   display control means for executing control in such a manner that the image data written by said writing means is displayed in accordance with the image display time;
   designating means for designating freezing of the image displayed by said display control means, and for cancelling said freezing;
   background-data supplying means for supplying data other than the image data received by said receiving means so as to be displayed as background-data;
   changeover means for changing over between reading of the image data from said memory means and reading of the background-data from said background-data supplying means; and
   freeze control means for controlling, based upon a designation made by said designating means, said display control means so as to freeze the displayed image, said background-data supplying means and said changeover means so as to temporarily display the background-data when freezing is cancelled.

7. The apparatus according to claim 6, wherein said freeze control means comprises:
   first monitoring means for monitoring completion of writing of the image data in said memory means by said writing means; and second monitoring means for monitoring the image display time determined by the image data received by said receiving means;

wherein when cancellation of freezing of the displayed image is designated by said designating means, control is executed based upon the monitoring performed by said first and second monitoring means in such a manner that the background data is supplied until writing of the image data by said writing means has been completed and the image display time has arrived.

* * * * *

UNITED STATES PATENT AND TRADEMARK OFFICE
CERTIFICATE OF CORRECTION

PATENT NO. : 5,317,399
DATED : May 31, 1994
INVENTOR(S) : Satake et al.

It is certified that error appears in the above-indentified patent and that said Letters Patent is hereby corrected as shown below:

COLUMN 2:

Line 45, "mean" should read --means--.

COLUMN 12:

Line 44, "above-m" should read --above-mentioned--.

Signed and Sealed this

Twenty-ninth Day of November, 1994

Attest:

BRUCE LEHMAN

Attesting Officer

Commissioner of Patents and Trademarks